UNITED STATES PATENT OFFICE.

LOUIS BASTET, OF BROOKLYN, NEW YORK, ASSIGNOR OF TWO-THIRDS OF HIS RIGHT TO JAMES G. NEWCOMB, OF HOBOKEN, NEW JERSEY, AND FEARGUS B. SQUIRE, OF BROOKLYN, NEW YORK.

MANUFACTURE OF SOAP.

SPECIFICATION forming part of Letters Patent No. 232,922, dated October 5, 1880.

Application filed February 9, 1880.

*To all whom it may concern:*

Be it known that I, LOUIS BASTET, of the city of Brooklyn, in the county of Kings and State of New York, have invented certain Improvements in the Manufacture of Soap, of which the following is a full, clear, and exact description.

This invention has reference to what are commonly known as "petroleum soaps;" and it consists, first, in the process of manufacture, and, secondly, in the soap itself as a new article.

The process of manufacture effects the solidifying of crude or refined petroleum-oils or other mineral oils or their products when forming a constituent of a saponaceous compound.

In carrying out this invention the following are the process and proportions employed: I first prepare a suitable alkali of 36° Baumé, placing it in a vessel. I then take equal parts of animal fatty matter and mineral oil in separate vessels. Taking the combined weight of the fatty matter and mineral oil as a standard, I then take of the alkali enough to dissolve a little less than one-half of one per cent. of boracic acid, and dissolve the acid in the alkali. I then heat the mineral oil to a temperature of about 90° Fahrenheit. I then liquefy the animal fatty matter by the application of heat, and while it is in this condition dissolve therein an amount of boracic acid which, with that used as above, will make up one-half of one per cent. of the combined weight of the fatty matter and mineral oil, as stated. The partially-acidified animal fatty matter and the mineral oil, being thus heated in separate vessels, are now united by gradually pouring the former into the latter, keeping up a constant stirring or agitation in order to effect a perfect combination. I then add, gradually, the acidified alkali, still keeping the mass in constant agitation. The process of converting the mineral oil, together with the fatty matter, into a solid is completed by gradually adding the ordinary or unacidified alkali in sufficient quantity to effect this result, keeping up the agitation as before. When the entire mass is found to be granulated the conversion into a saponaceous compound is complete.

While animal fatty matter only has been mentioned, the same results can be reached by the use of vegetable fatty matter or a mixture of animal and vegetable fatty matters.

I then finish the soap by the free use of steam. The liquefaction is accomplished by a free jet of steam to thoroughly disoxygenate the saponified matter and disintegrate the compound. After this use of steam for the purpose stated I cook the soap by the employment of superheated steam.

Having thus described my invention, I claim—

1. The process of forming a saponaceous compound, consisting of combining mineral oil with animal and vegetable fatty matter, or either, boracic acid, and an alkali, substantially as set forth.

2. As a new article of manufacture, a soap compound consisting of mineral oil and a fatty substance, all solidified, substantially as specified.

In testimony whereof I hereto subscribe my name this 3d day of February, A. D. 1880.

LOUIS BASTET.

Witnesses:
GEORGE H. HOWARD,
FEARGUS B. SQUIRE.